US007515549B2

(12) United States Patent
Wing et al.

(10) Patent No.: US 7,515,549 B2
(45) Date of Patent: Apr. 7, 2009

(54) MANAGING DEVICES ACROSS NAT BOUNDARIES

(75) Inventors: Daniel G. Wing, San Jose, CA (US); Shiva J. Shankar, Bangalore (IN); Ottalingam Satyanarayanan, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 728 days.

(21) Appl. No.: 11/147,713

(22) Filed: Jun. 7, 2005

(65) Prior Publication Data

US 2006/0274741 A1 Dec. 7, 2006

(51) Int. Cl.
*H04L 12/26* (2006.01)
*H04L 12/28* (2006.01)
*G06F 15/16* (2006.01)
(52) U.S. Cl. .................. 370/252; 370/255; 370/401; 709/224; 709/245
(58) Field of Classification Search ............... None
See application file for complete search history.

(56) References Cited

U.S. PATENT DOCUMENTS

| | | | | |
|---|---|---|---|---|
| 6,405,250 | B1* | 6/2002 | Lin et al. ............... | 709/224 |
| 7,047,314 | B2* | 5/2006 | Sato et al. ............... | 709/238 |
| 7,334,049 | B1* | 2/2008 | Somasundaram et al. ... | 709/245 |
| 7,349,960 | B1* | 3/2008 | Pothier et al. ........... | 709/224 |
| 7,411,975 | B1 | 8/2008 | Mohaban | |
| 2002/0059455 | A1* | 5/2002 | Tajiri et al. ............ | 709/245 |
| 2003/0084162 | A1* | 5/2003 | Johnson et al. ......... | 709/227 |
| 2004/0249931 | A1* | 12/2004 | Garg et al. ............. | 709/224 |
| 2005/0058132 | A1 | 3/2005 | Okano et al. | |
| 2005/0105508 | A1* | 5/2005 | Saha ................... | 370/352 |
| 2005/0144314 | A1* | 6/2005 | Kan et al. ............. | 709/238 |
| 2005/0286519 | A1* | 12/2005 | Ravikumar et al. ...... | 370/389 |
| 2006/0029083 | A1* | 2/2006 | Kettlewell et al. ...... | 370/401 |
| 2006/0077988 | A1* | 4/2006 | Cheng et al. .......... | 370/401 |
| 2006/0209794 | A1* | 9/2006 | Bae et al. ............. | 370/352 |
| 2007/0036143 | A1* | 2/2007 | Alt et al. .............. | 370/352 |
| 2007/0150552 | A1* | 6/2007 | Harris et al. .......... | 709/218 |
| 2007/0165629 | A1* | 7/2007 | Chaturvedi et al. ..... | 370/389 |

(Continued)

OTHER PUBLICATIONS

U.S. Appl. No. 11/177,160, Wing et al., "Domain-based Routing for Managing Devices Operating Behind a NAT", filed Jul 7, 2005.*

(Continued)

*Primary Examiner*—Gregory B Sefcheck
(74) *Attorney, Agent, or Firm*—Stolowitz Ford Cowger LLP (57) ABSTRACT

An address management scheme allows a Network Management System (NMS) to manage devices in a private network operating behind a Network Address Translator (NAT) boundary. A device operating in the private network sends a communication to a Simple Traversal of User Datagram Protocol (UDP) Through Network Address Translators (NATs) (STUN) server. The STUN server responds by communicating a public NAT IP address and a NAT port number back to the device. The device then provides the NMS with the public NAT IP address, a NAT port number associated with the device, a unique device identifier, and the private device IP address. The NMS stores this information in a table and then accesses this address information to manage the device in the private network. The device then uses the STUN server to identify any changes to the device address information and then sends the changes to the NMS.

18 Claims, 9 Drawing Sheets

U.S. PATENT DOCUMENTS

2007/0180116 A1* 8/2007 Kim et al. .................. 709/226
2008/0126528 A1* 5/2008 Takeda et al. .............. 709/223

OTHER PUBLICATIONS

"STUN—Simple Traversal of User Datagram Protocol (UDP) Through Network Address Translators (NATs)", J. Rosenberg et al., Mar. 2003, pp. 1-44.

"Network Address Translation Port Mapping Protocol (NAT-PMP)", Jul. 22, 2004, pp. 1-9.

"Maksat Network Management System", Specification Sheet, Reference Manual, and Basic Setup Guide, pp. 1-9, originally taken from http://www.maksat.com/nms.htm (link no longer available), publication date unknown, downloaded Jun. 6, 2005.

"Management of NAT-Based Private Networks", O.T. Satyanarayanan, J. Shiva Shankar, Jun. 13, 2005, pp. 1-14.

"Basic Dial NMS Implementation Guide - Overview of Basic SNMP Building Blocks", Aug., 2000, pp. 13-25.

"Maksat Network Management System", Specification Sheet, Reference Manual, and Basic Setup Guide, downloaded Jun. 6, 2005, pp. 1-9, http://www.maksat.com/nms.htm (dead link).

* cited by examiner

FIG.1A
(Background)

FIG.1B (Background)

FIG.2A

| DEVICE | PUBLIC IP | PORT # | UNIQUE ID | PRIVATE IP |
|---|---|---|---|---|
| IP PHONE 18 | NAT 20 IP=Z 38 | NAT 20 42 | IP PHONE 18 MAC ADD.= Q 48 | IP PHONE 18 192.168.0.3 46 |
| COMPUTER 16A | NAT 20 IP=Z | NAT 20 40 | COMPUTER 16A MAC ADD.= R 48 | COMPUTER 16A 192.168.0.1 |
| COMPUTER 16B | NAT 20 IP=Z | NAT 20 41 | COMPUTER 16B MAC ADD.= S 48 | COMPUTER 16B 192.168.0.2 |

FIG.2B

| DEVICE | PUBLIC IP | PORT # | UNIQUE ID | PRIVATE IP |
|---|---|---|---|---|
| IP PHONE 18 | NAT 20 IP=Z | NAT 20 42 | IP PHONE 18 MAC ADD.= Q | IP PHONE 18 192.168.0.3 |
| 16A | NAT 20 IP=Z | NAT 20 40 | COMPUTER 16A MAC ADD.= R | COMPUTER 16A 192.168.0.1 |
| 16B | NAT 20 IP=Z | NAT 20 41 | COMPUTER 16B MAC ADD.= S | COMPUTER 16B 192.168.0.2 |
| 19A | NAT 20 IP=Z | NAT 20 80 | COMPUTER 19A MAC ADD.= T | COMPUTER 19A 192.168.0.1 |
| 19B | NAT 20 IP=Z | NAT 20 81 | COMPUTER 19B MAC ADD.= U | COMPUTER 19B 192.168.0.1 |

MANAGING DEVICES ACROSS NAT BOUNDARIES

BACKGROUND OF THE INVENTION

This invention relates generally to network management and more particularly to managing devices across Network Address Translator (NAT) boundaries using Simple Traversal of User Datagram Protocol (UDP) Through Network Address Translators (NATs) (STUN) servers.

A Network Management System (NMS) can manage many devices including computers and Internet Protocol (IP) telephones. Management can include network management, changing system settings, recording failures of network devices, discovering what hardware components are installed in network devices, discovering what software is installed on the device, etc.

Figure 1A:
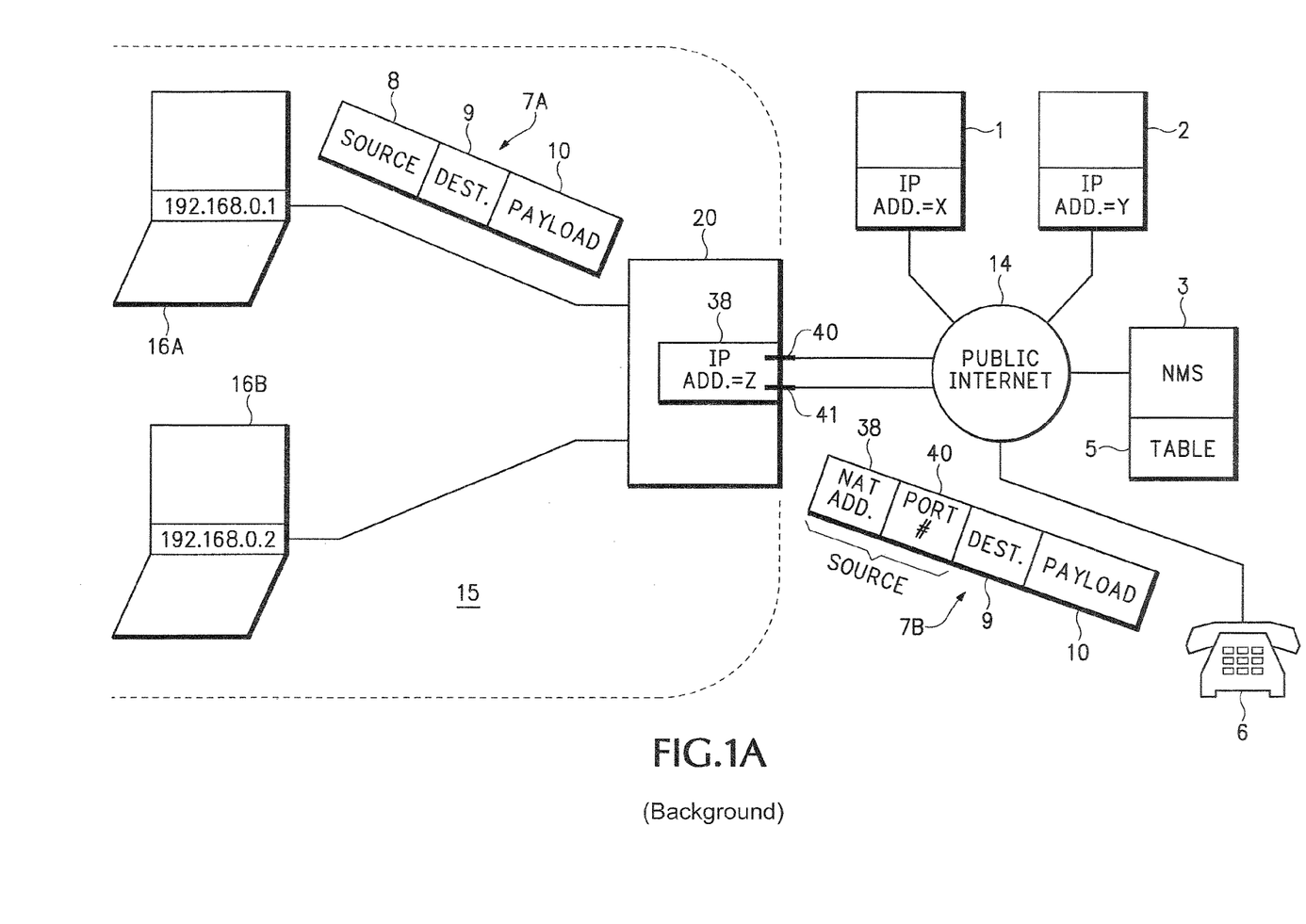
FIG. 1A is a diagram of an NMS managing two devices.

FIG. 1A shows an NMS 3 used for managing computers 1 and 2. A table 5 stores the IP addresses of the devices managed by the NMS 3. The table 5 is shown in more detail in FIG. 1B and includes entries listing the IP addresses of the computers 1 and 2 managed by NMS 3. The NMS 3 communicates with the computers 1 and 2 using the public IP addresses X and Y, respectively. For example, the NMS uses IP address X in table 5 to communicate with computer 1.

Referring back to FIG. 1A, Network Address Translator (NAT) 20 and computers 16A and 16B reside within a private network 15. The NAT 20 has a public IP address 38 and assigns private IP addresses to computers 16A and 16B. The NAT 20 is designed for IP address simplification and conservation, by enabling the private IP network 15 to use non-registered (private) IP addresses. The NAT 20 operates as a router connecting the private network 15 together with the public network 14. The NAT 20 translates the private (not globally unique) addresses used in the private network 15 into public IP addresses. As part of this functionality, NAT 20 can be configured to advertise only one public address to the public network 14 that represents the entire private network 15.

For example, computers 16A and 16B communicate over Internet network 14 using the public IP address 38 provided by the NAT 20. The NAT 20 receives a packet 7A from a device on private network 15, such as computer 16A. The packet 7A includes a private source address 8 and a destination IP address 9 for an endpoint such as IP phone 6. Packet 7A also includes a payload 10. The NAT 20 reformats packet 7A into a packet 7B that replaces the private source address 8 with the NAT's public IP address 38 and a port number 40 that the NAT 20, associates with computer 16A. The NAT 20 then forwards the reformatted packet 7B to IP phone 6.

The IP phone 6 sends packets (not shown) back to the computer 16A that includes the public IP address 38 and port number 40 for the NAT 20. The NAT 20 receives and forwards the packet from IP phone 6 to computer 16A based on the port number 40.

Figure 1B:
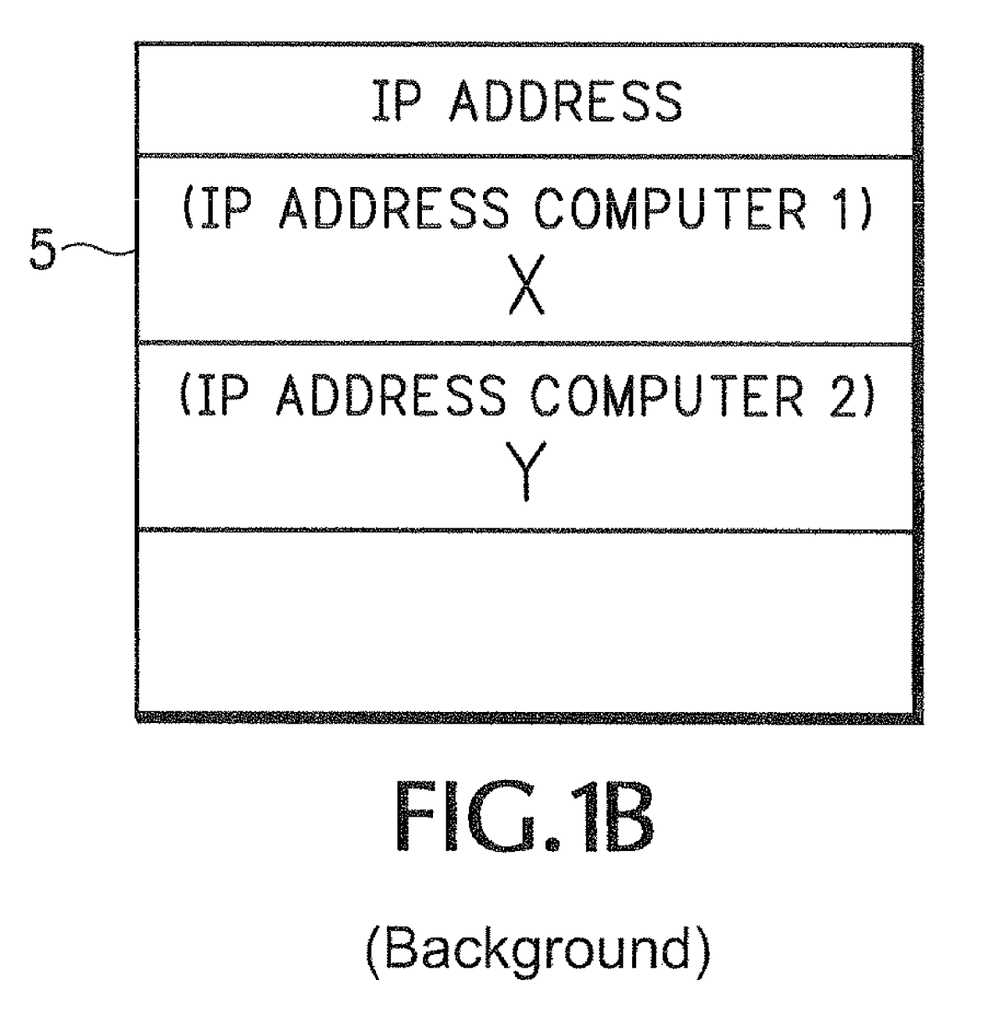
FIG. 1B is a diagram of a table used by the NMS in FIG. 1A.

The NMS 3 cannot manage computers 16A and 16B behind NAT 20 for several reasons. First, the table 5 in NMS 3 only includes public IP device addresses. The NMS 3 does not have the ability to obtain the private IP addresses and port numbers needed for communicating with computers 16A and 16B. Even if the NMS 3 could obtain the private IP addresses and port numbers associated with of computers 16A and 16B, these addresses are not routable from the NMS. Additionally, the private IP addresses may be dynamically reassigned whenever the NAT 20 is reset. Port numbers are also typically refreshed in unison with the private IP address reassignment.

Because of the forgoing limitations, network management servers are unable to manage devices operating in private networks behind NATs. The disclosure that follows solves this and other problems associated with the prior art.

SUMMARY OF THE INVENTION

An address management scheme allows a Network Management System (NMS) to manage devices in a private network operating behind a Network Address Translator (NAT) boundary. A device operating in the private network sends a communication to a Simple Traversal of User Datagram Protocol (UDP) Through Network Address Translators (NATs) (STUN) server. The STUN server responds by communicating a public NAT IP address and a NAT port number back to the device. The device then provides the NMS with the public NAT IP address, a NAT port number associated with the device, a unique device identifier, and the private device IP address. The NMS stores this information in a table and then accesses this address information to manage the device in the private network. The device then uses the STUN server to identify any changes to the device address information and then sends the changes to the NMS.

The foregoing and other objects, features and advantages of the invention will become more readily apparent from the following detailed description of a preferred embodiment of the invention which proceeds with reference to the accompanying drawings.

DETAILED DESCRIPTION

Figure 2A:
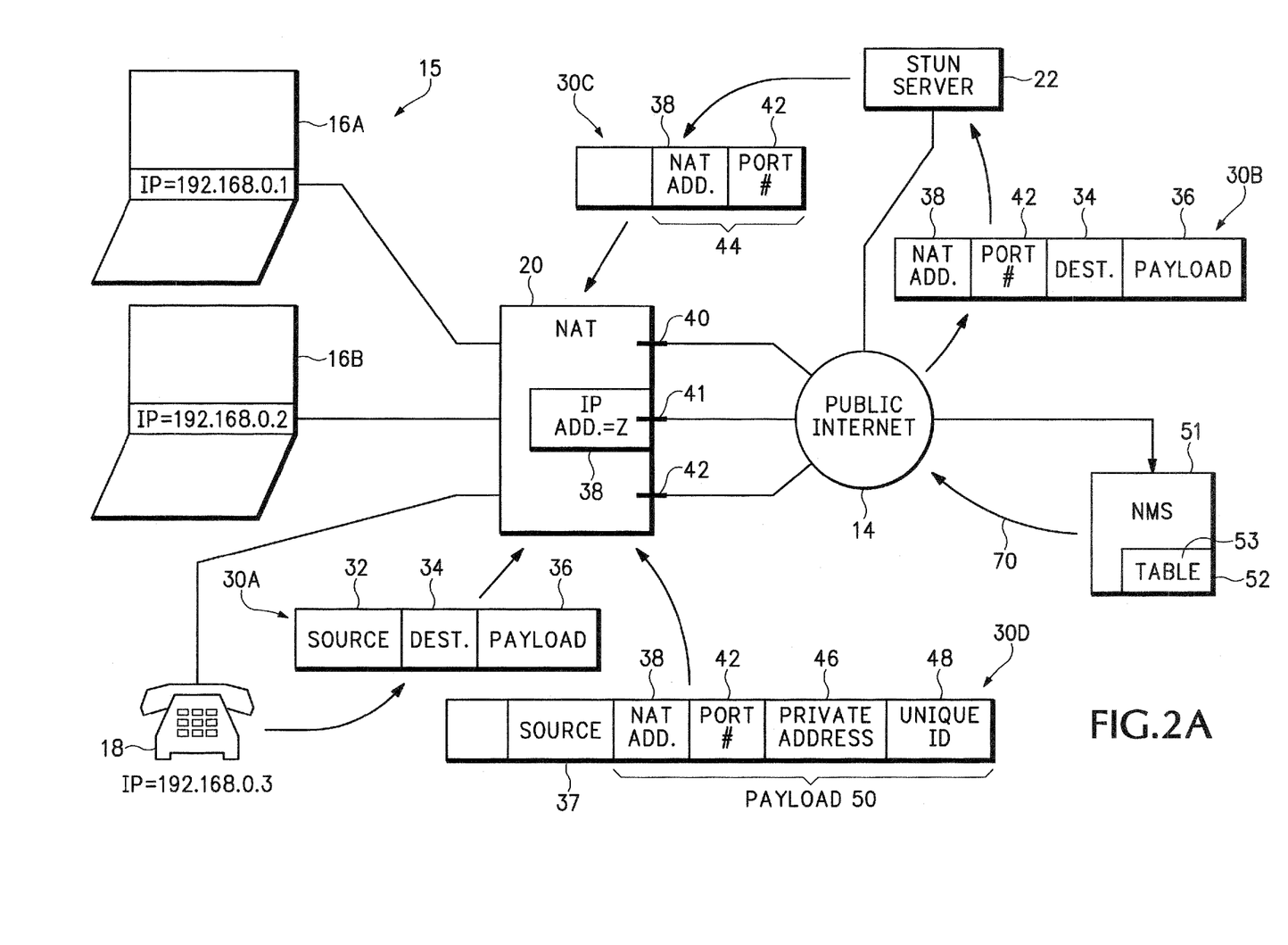
FIG. 2A is a diagram of an NMS managing devices in a private network.

FIG. 2A shows an NMS 51 that manages devices 16A, 16B, and 18 in the private network 15 behind NAT 20. The NMS 51 includes a table 52 that includes information necessary for the NMS 51 to manage devices 16A, 16B, and 18. The devices 16A, 16B, and 18 utilize Simple Traversal of User Datagram Protocol (UDP) Through Network Address Translators (NATs) (STUN) in a novel way to ensure that the information in table 52 is adequate for the NMS 51 to manage the NAT devices 16A, 16B and 18. The devices 16A, 16B and 18 also automatically update table 52 with any local address changes.

STUN is described in Request for Comment (RFC) 3489 which is herein incorporated by reference. STUN typically is used for NAT traversal during voice communications and with Internet telephony signaling protocols such as Session Initiated Protocol (SIP).

In the example below, IP phone 18 is managed by NMS 51. A STUN server 22 is used by the IP phone 18 to determine the public NAT IP address 20 and to determine what NAT port number is associated with the IP phone 18. IP phone 18 also uses the STUN server 22 to determine when the public IP address for NAT 20 has changed or when the NAT 20 has reassigned the IP phone 18 to a different port number.

The IP phone 18 sends an IP packet 30A to the STUN server 22. The NAT 20 replaces the private device source address 32 with the public NAT IP address 38 and NAT port number 42 before forwarding the reformatted packet 30B to the STUN server 22. The STUN server 22 inserts the public NAT address 38 and NAT port number 42 into the payload 44 of a return packet 30C and sends the packet 30C back to NAT 20. The NAT 20 then forwards the return packet 30C back to the IP phone 18.

Once the NAT address 38 and port number 42 are acquired, the IP phone 18 sends this information to the NMS 51. The IP phone 18 sends a packet 30D to the NMS 51. In one embodiment, a payload 50 for the packet 30D includes the public NAT IP address 38, the NAT port number 42, a private IP address 46 for the IP phone 18, and a unique identifier 48 for the IP phone 18. The NAT IP address 38 and port number 42 may also be provided to the NMS 51 through a source address field 37 in packet 30D instead of in the payload 50, or in addition to inclusion in the payload 50. The unique identifier 48 associated with the IP phone 18 may be a MAC address, certificate, user name, or any other identifier that is unique to IP phone 18 in private network 15.

Figure 2B:
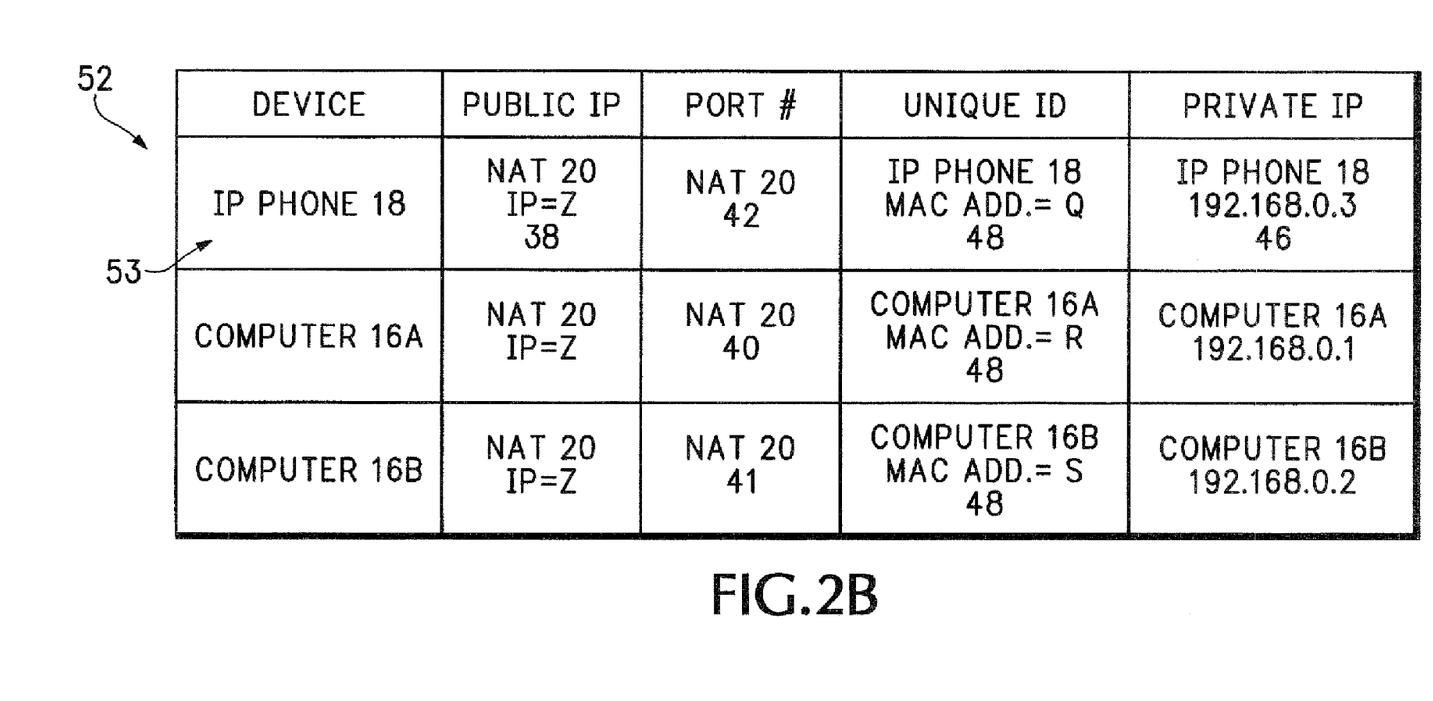
FIG. 2B is a table used by the NMS in FIG. 2A.

Once the packet 30D is received, the NMS 51 adds an entry 53 for IP phone 18 to a table 52, shown in more detail in FIG. 2B. Entry 53 includes NAT public IP address 38, NAT port number 42, private IP address 46 of the IP phone 18, and unique identifier 48 for IP phone 18. The unique information in entry 53 allows NMS 51 to conduct management operations 70 (FIG. 2A) with the IP phone 18 including changing system settings, monitoring, phone operations, etc.

Referring back to FIG. 2A, the NAT 20 may change the port number associated with the IP phone 18. The IP phone 18 communicates these changes, such as the public NAT IP address 38 and the NAT port number 42, to the NMS 51. These changes are detected by the IP phone 18 and notified to the NMS 51 using additional communications similar to 30A-30D. The frequency of the additional communications similar to 30A-30D may correspond with how often the NAT 20 typically changes the port number associated with the IP phone 18. STUN provides a method of determining an adequate frequency for additional communications as described in Request for Comment (RFC) 3489.

The IP phone 18 can also periodically determine whether the NAT 20 has reassigned the private IP address of the IP phone 18 and whether the unique identifier 48 of the IP phone 18 has changed. In one embodiment, the IP phone 18 uses STUN to determine if the private IP address of the IP phone 18 has changed. In another embodiment, the IP phone 18 locally determines if the private IP address 46 or unique identifier 48 has changed by running local processes. The optional local processes will be described in more detail below.

If any of the information including the public NAT IP address 38, the NAT port number 42, the private IP address 46 of the IP phone 18, or the unique identifier 48 of the IP phone 18 changes, the IP phone 18 sends a packet similar to 30D to the NMS 51 updating the new information in entry 53 of table 52.

Figure 3A:
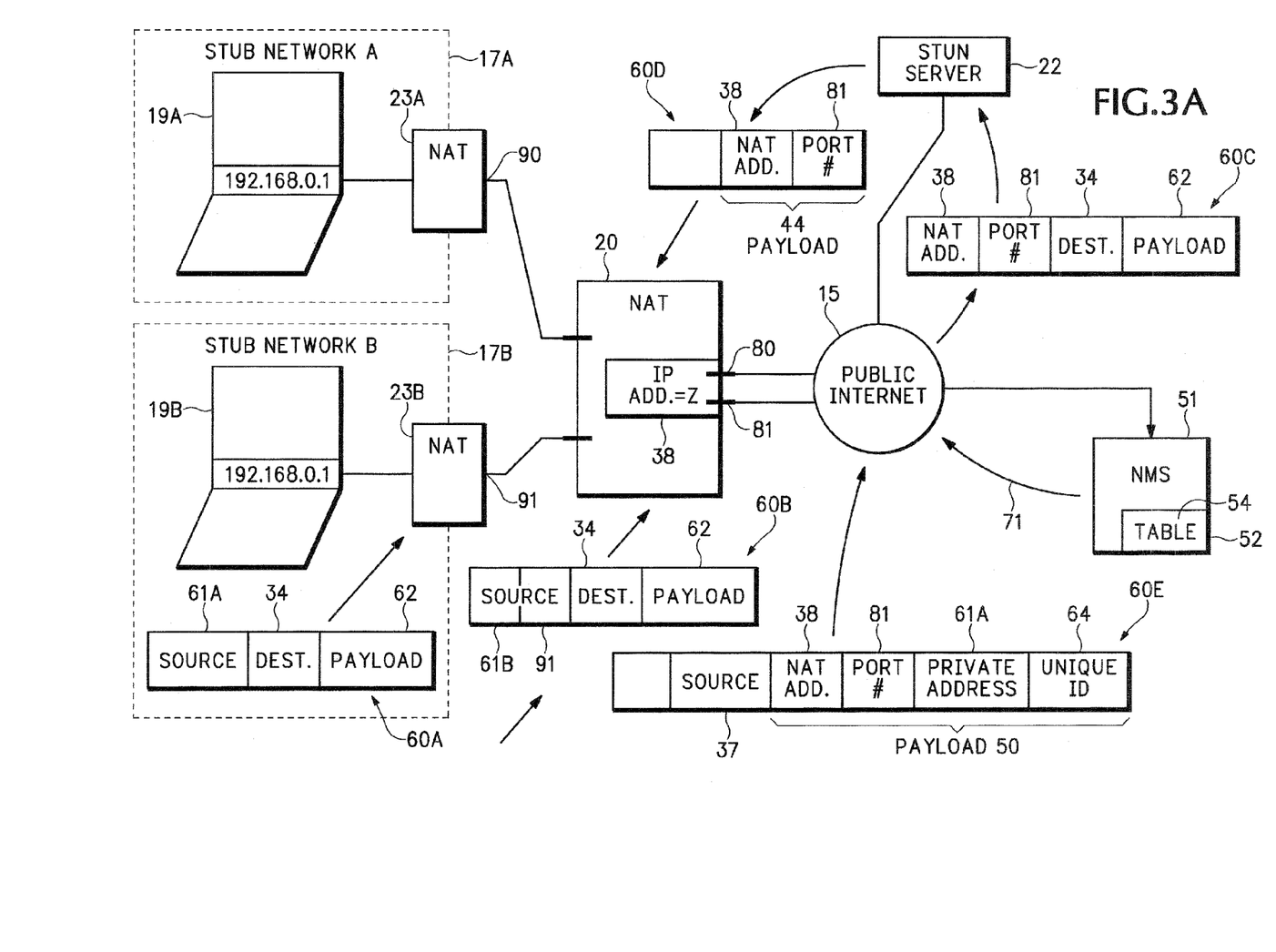
FIG. 3A is a diagram showing the NMS managing two devices in a nested NAT configuration.

Referring now to FIG. 3A, the NMS 51 can also manage devices in a private network containing nested NATs. Computer 19A and computer 19B reside in different stub networks 17A and 17B, respectively. In this example, NAT 23A has currently assigned the IP address 192.168.0.1 to computer 19A and NAT 23B has currently assigned the same IP address 192.168.0.1 to computer 19B.

Computers 19A and 19B communicate with the STUN server 22 to determine the public NAT IP address 38 and their assigned port numbers 80 and 81, respectively assigned by NAT 20. For example, computer 19B sends an IP packet 60A to NAT 23B. The source address 61A is replaced with the IP address 61B and port number 91 for NAT 23B before the reformatted packet 60B is forwarded to NAT 20. The NAT 20 replaces the source address 61B and the port number 91 with the public NAT IP address 38 and port number 81 before forwarding the reformatted packet 60C to the STUN server 22.

The STUN server 22 inserts the public NAT IP address 38 and port number 81 into the payload 44 of return packet 60D and sends the return packet 60D back to NAT 20 at port number 81. Because the return packet 60D is received at port number 81, NAT 20 forwards the return packet 60D to NAT 23B at port number 91. Because the return packet 60D is received at port number 91, NAT 23B forwards the return packet 60D to computer 19B.

Once the contact information including the NAT address 38 and the port number 81 are received in payload 44, the computer 19B forwards the contact information to the NMS 51 in packet 60E. In one embodiment, the payload 50 of packet 60E includes the IP address 38 and the port number 81 for NAT 20, the private IP address 61A for the computer 19B, and a unique identifier 64 for the computer 19B. Optionally the NAT address 38 and port number 81 may be provided to the NMS 51 via the source field 37 instead of in the payload 50. In one embodiment the unique identifier 48 for the computer 19B is a MAC address.

Figure 3B:
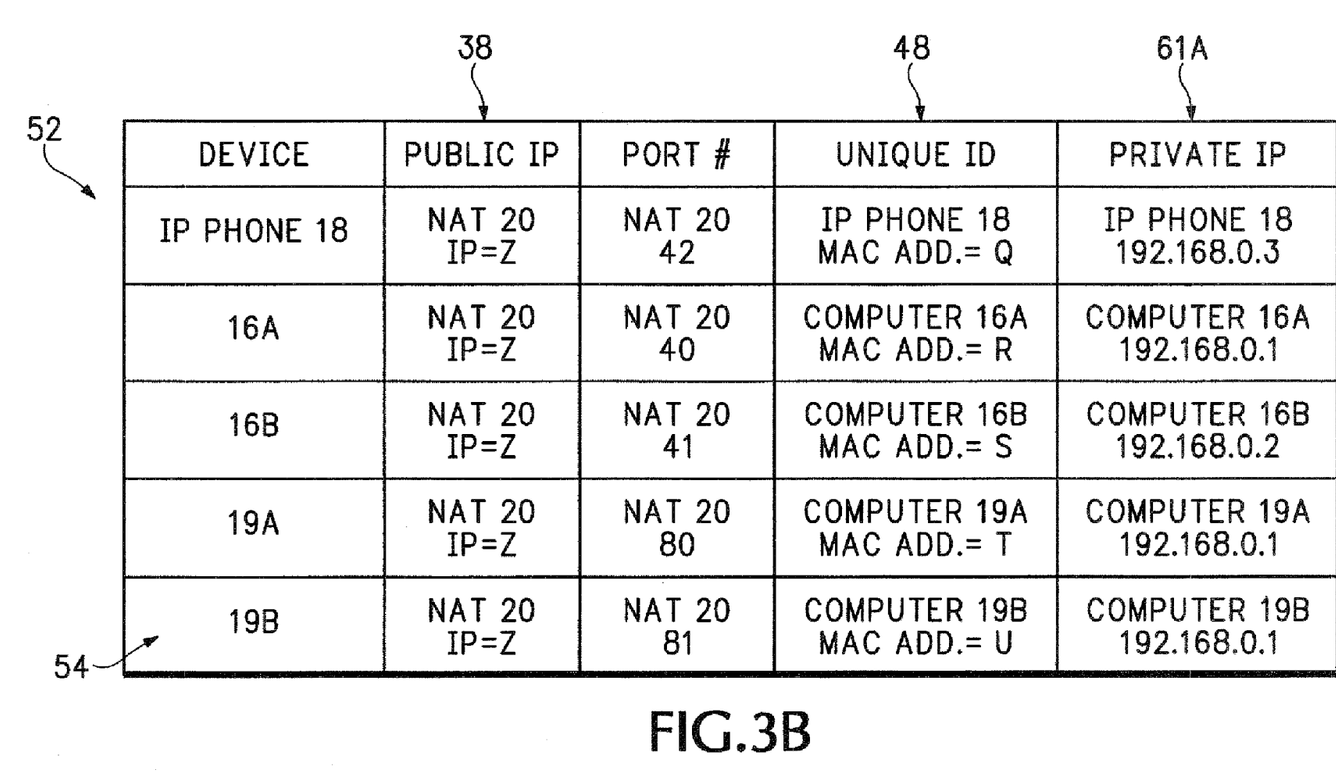
FIG. 3B is a diagram of the table used by the NMS in FIG. 3A.

Once the packet 60E is received, the NMS 51 adds an entry 54 to table 52 for computer 19B. Table 52 is shown in more detail in FIG. 3B. The information in entry 54 allows NMS 51 to manage computer 19B. Computer 19A provides information to the NMS 51 in the same manner as computer 19B so that the NMS 51 can also manage computer 19A.

The NAT address 38 for computers 19A and 19B is the same since both computers are located behind NAT 20. In this example, the private IP address values 61A for computers 19A and 19B also happen to be the same. However, the port numbers 80 and 81 for computers 19A and 19B, respectively, are different. This provides unique contact information to NMS 51 for computers 19A and 19B.

Even though the NMS 51 has different contact information for computers 19A and 19B, the unique identifiers 48 allow the NMS 51 to reliably distinguish between each computer operating in the private network. This is because the NAT 20 may from time to time reassign port numbers for computers 19A and 19B. For example, NAT 20 may reassign port numbers when rebooted. Even if NAT 20 swaps the port numbers associated with computers 19A and 19B, NMS 51 can still identify computers 19A and 19B via their associated MAC address as shown by unique identifiers 48 in FIG. 3B.

Figure 4:
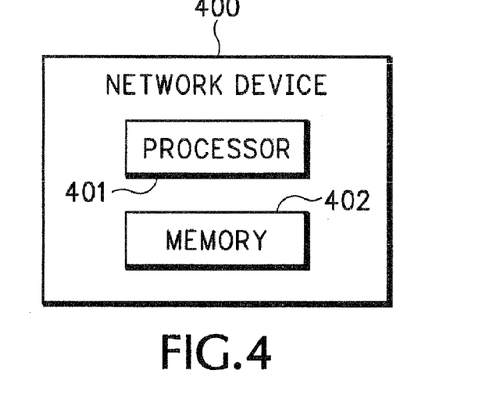
FIG. 4 is a detailed diagram of the device operating in a private network.

FIG. 4 shows a device 400 operating in a private network that provides contact information to the NMS 51. The device 400 includes a processor 401 and a memory 402. The memory 402 includes instructions that, when executed by the processor 401, perform the functions described in the flowcharts of FIGS. 5 and 6.

Figure 5:
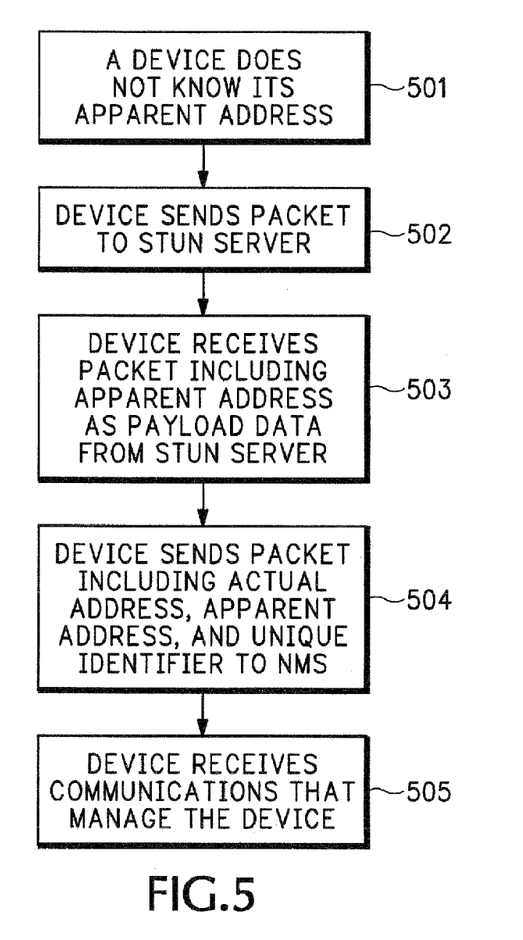
FIG. 5 is a flowchart showing how the device operates in the private network.

Referring to FIG. 5, the device 400 in block 501 does not know its apparent address. An apparent address is either the actual public IP address of the device 400, or if the device is behind a NAT, the public NAT IP address and port number. The device 400 generates and sends a first packet to the STUN server in block 502. In block 503, the device 400 receives a response packet back from the STUN server that includes the apparent address of the device. The apparent address will either be the actual address of the device 400 or the IP public address and port number of an intervening NAT. In a nested NAT configuration when there is more than one intervening NAT, the apparent address will be the public IP address and port of the NAT connected the public IP network.

After receiving a response back from the STUN server, the device 400 in block 504 sends a second packet including the apparent address, the actual address of the device 400, and a unique identifier for the device 400 to the NMS. The device 400 in block 505 then receives management communications from the NMS. In one embodiment, the management communications are made according to Simple Network Management Protocol (SNMP). The device 400 also detects changes in the apparent address, the actual address, and the unique identifier as shown in the flowchart in FIG. 6.

Figure 6:
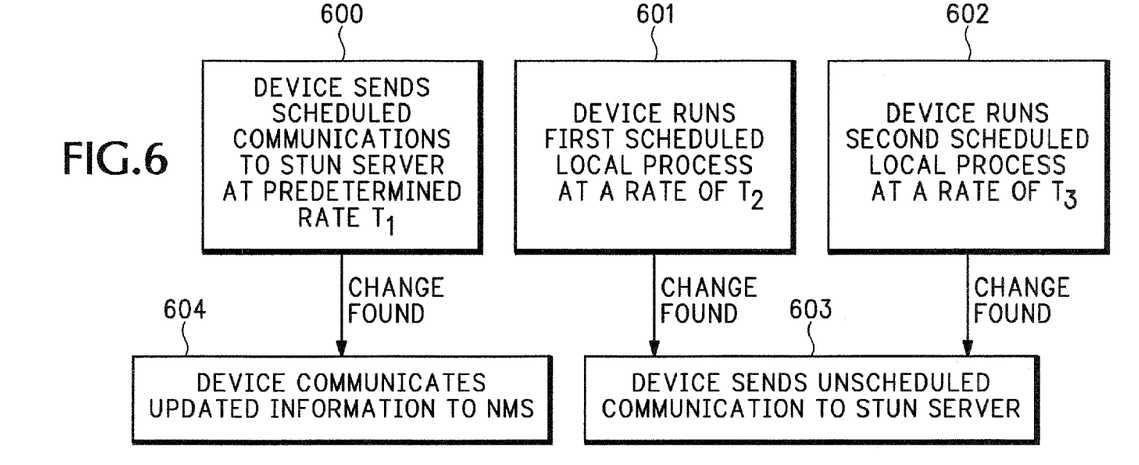
FIG. 6 is a flowchart showing how the device monitors local address changes.

Referring to FIG. 6, a NAT frequently changes port assignments and sometimes the NAT public IP address. The device 400 in block 600 accordingly, either periodically, or based on detected events, sends communications to the STUN server to monitor any changes in the apparent address. Whenever an event such as a device or NAT reset is detected, the device 400 sends another message to the STUN server. The device 400 also may send pre-scheduled communications to the STUN server at predetermined rates. The frequency with which the device sends scheduled communications to the STUN server can be determined according to RFC 3489.

In one embodiment, the device in block 600 sends scheduled communications to the STUN server at a predetermined rate $T_1$. The device can also run two scheduled local processes at predetermined rates to determine whether the actual address or the unique identifier has changed. Since the unique device identifier is relatively static in this embodiment, the device runs a first scheduled local process at a slow rate of $T_2$ in block 601 to determine whether the unique device identifier has changed. The device runs a second scheduled local process at a faster rate of $T_3$ in block 602 to determine whether the actual address assigned to the device by NAT has changed. Port number reassignment by the NAT often occurs in unison with actual address reassignment by the NAT. Thus, when the second scheduled process 602 determines that the actual address assigned to the device by the NAT has changed, the NAT port number has probably also changed. Therefore, if the second scheduled local process 602 detects that the actual address has changed, the device makes an unscheduled communication with the STUN server in block 603.

Because the unscheduled communications 603 detect port number reassignment, the frequency of scheduled communications 600 to the STUN server may be reduced. If any scheduled communication 600 or unscheduled communication 603 with the STUN server detect change to the apparent address, the actual address, or the unique identifier, the device updates the NMS in block 604.

Figure 7:
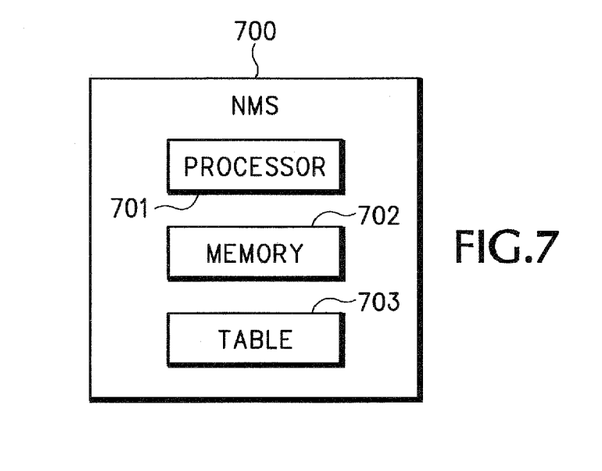
FIG. 7 is a diagram of the NMS shown in FIGS. 2A and 3A.
Figure 8:
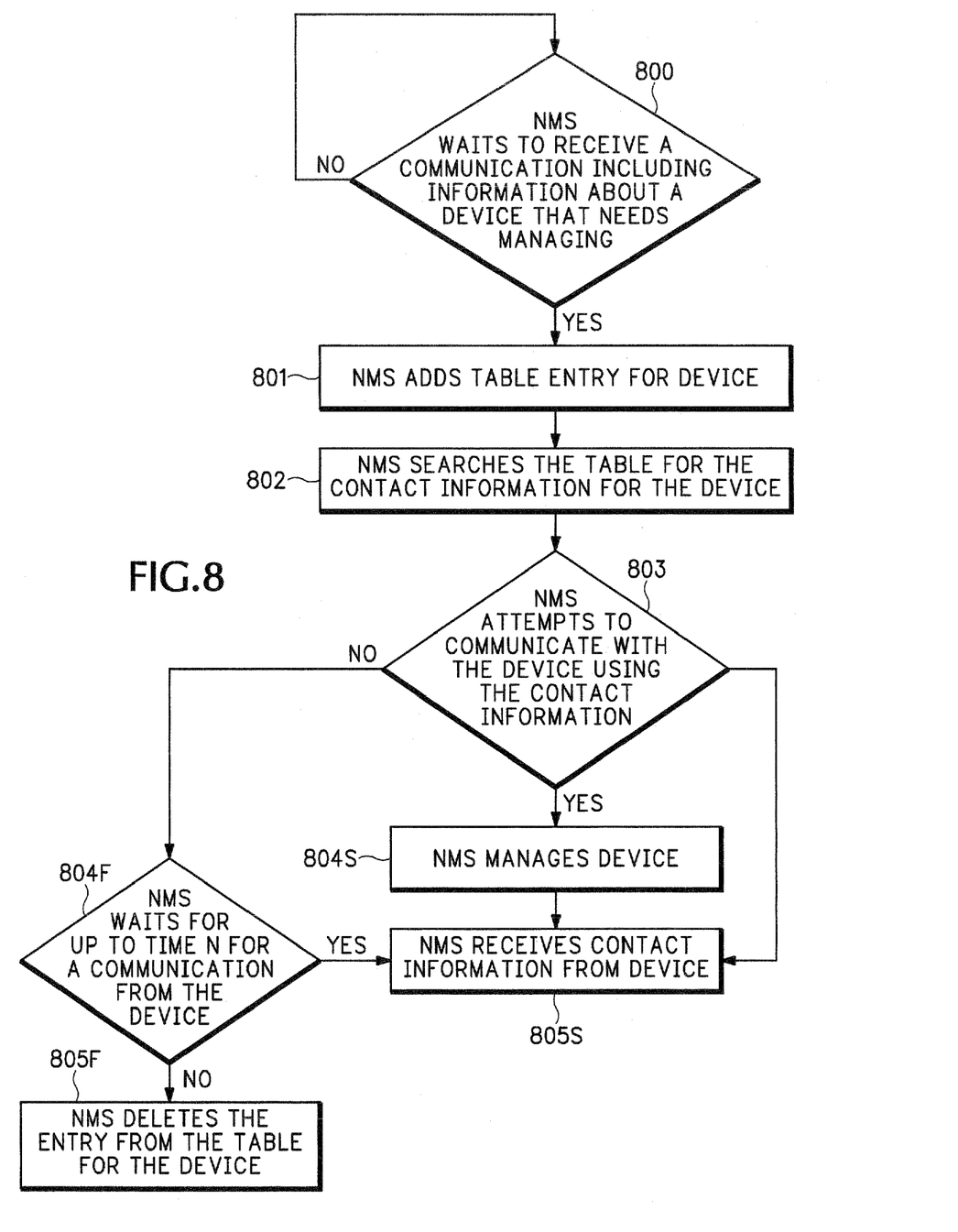
FIG. 8 is a flowchart showing how the NMS shown in FIGS. 2A and 3A manages devices in a private network.

Referring now to FIGS. 7 and 8, an NMS 700 that manages devices either directly or across NAT boundaries is shown. The NMS 700 includes a processor 701, a memory 702, and table 703. The memory 702 includes instructions that, when executed by a processor, perform functions described in the flowchart of FIG. 8.

Referring to FIG. 8, in block 800 the NMS 700 waits to receive information about a device that needs to be managed. When the information is received, the NMS 700 adds a table entry for the device in block 801. The table entry includes an apparent address of the device, an actual address of the device and a unique identifier. In block 802, the NMS 700 searches the table for an entry associated with a device that needs to be managed. In block 803, the NMS 700 attempts to communicate with the device based on the contact information in the associated table entry. If the communication is successful, the NMS 700 manages the device in block 804S.

If communication with the device fails, the NMS 700 in block 804F waits for an amount of time N for updated contact information from the device. If an update is received within time N in block 805S, the NMS 700 re-attempts to communicate with the device in block 803. Optionally, if the NMS 700 fails to receive an update within time N, the NMS 700 deletes the entry for that device in block 805F.

The system described above can use dedicated processor systems, micro controllers, programmable logic devices, or microprocessors that perform some or all of the operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

Having described and illustrated the principles of the invention in a preferred embodiment thereof, it should be apparent that the invention may be modified in arrangement and detail without departing from such principles. I claim all modifications and variation coming within the spirit and scope of the following claims.

What is claimed is:

1. A network device, comprising:
one or more processors; and
a memory coupled to the one or more processors comprising instructions executable by the processors, the processors operable when executing the instructions to:
send a Simple Traversal of User Datagram Protocol (UDP) Through Network Address Translators (NATs) (STUN) message to a STUN server;
analyze a response to the STUN message to discover an address and port number combination of a network address translation gateway operating between the network device and the STUN server;
send addressing information to a management server, the addressing information including the gateway address and port number combination as well as a unique identifier for the network device and a local address currently assigned to the network device by the gateway; and
after sending the addressing information to the management server, intelligently monitor for changes to the gateway address and port number combination and proactively provide said changes to the management server, said intelligent monitoring including:
detecting when the local address for the network device is dynamically reassigned by the gateway; and in response to detecting local address reassignment, sending a new STUN message to the STUN server to determine whether the gateway address and port number combination has changed in conjunction with the local address reassignment.

2. The network device of claim 1, wherein the intelligent monitoring for the changes to the gateway address and port number combination further comprises:
sending scheduled STUN messages to the STUN server according to every occurrence of a periodic interval, the scheduled STUN messages sent independently of said detecting.

3. The network device of claim 2, wherein the intelligent monitoring for the changes to the gateway address and port number combination further comprises:
executing a local process to identify any changes to the unique identifier; and
sending an unscheduled STUN message to the STUN server in response to identifying a unique identifier change, wherein the unscheduled STUN message is sent independently of the periodic interval.

4. The network device of claim 3, wherein the local process is executed according to a schedule, and wherein the scheduled STUN messages are sent more frequently than execution of the local process.

5. The network device of claim 1, wherein the intelligent monitoring for the changes to the gateway address and port number combination further comprises:
detecting a reset on the gateway; and
in response to detecting the gateway reset, send the new STUN message to the STUN server to determine whether the gateway address and port number combination has changed in conjunction with the reset.

6. A network device, comprising:
one or more processors; and
a memory coupled to the one or more processors comprising instructions executable by the processors, the processors operable when executing the instructions to:
send a Simple Traversal of User Datagram Protocol (UDP) Through Network Address Translators (NATs) (STUN) message to a STUN server;
analyze a response to the STUN message to determine whether a network address translation device is operating between the network device and the STUN server;
if the analysis indicates that the network address translation device is operating between the network device and the STUN server, send a communication providing a unique identifier for the network device and a public IP address and port number for the network address translation device to a management server; and
thereafter continuously monitor for changes to the unique identifier and the public address and port number combination by sending a combination of scheduled and unscheduled STUN requests to the STUN server and proactively notify the management device of any changes detected during the continuous monitoring.

7. The network device of claim 6, wherein the continuous monitoring includes:
sending the scheduled STUN messages to the STUN server according to every occurrence of a periodic interval.

8. The network device of claim 7, wherein the continuous monitoring further includes:
executing a local process to identify any changes to the unique identifier; and
sending the unscheduled STUN message to the STUN server in response to identifying a unique identifier change, wherein the unscheduled STUN message is sent independently of the periodic interval.

9. The network device of claim 8, wherein the local process is executed according to a schedule, and wherein the scheduled STUN messages are sent more frequently than execution of the local process.

10. The network device of claim 6, wherein the processors are further operable to:
detect a reset of the network address translation device;
in response to the reset detection, send the unscheduled STUN message to the STUN server; and
if a response to the unscheduled STUN message indicates a change to the public address and port number combination for the network address translation device, notify the management server.

11. The network device of claim 6, wherein the processors are further operable to:
detect when the network address translation device has dynamically reassigned a private IP address for the network device; and
in response to detecting dynamic private IP address reassignment, send the unscheduled STUN message to the STUN server to determine whether the public address and port number combination has changed in conjunction with the dynamic private IP address reassignment.

12. The network device of claim 11, wherein the processors are further operable to:
periodically send the scheduled STUN messages to the STUN server according to every occurrence of a periodic interval.

13. A method, comprising:
sending an address request from a network device to an address request server;
analyze a response to the address request to discover an address and port number combination of a network address translation gateway operating between the network device and the address request server;
send addressing information to a management server, the addressing information including the gateway address and port number combination as well as a local address currently assigned to the network device by the gateway and a unique identifier for the network device; and
after sending the addressing information to the management server, intelligently monitor for changes to the gateway address and port number combination and proactively provide said changes to the management server, said intelligent monitoring including:
monitoring the gateway to determine when the gateway processes a predefined event; and
in response to detecting the predefined event, sending a new address request to determine whether the gateway address and port number combination has changed in conjunction with the predefined event.

14. The method of claim 13, wherein the predefined event is a dynamic address reassignment.

15. The method of claim 14, wherein the intelligent monitoring for the changes to the gateway address and port number combination further comprises:
sending a scheduled address request at every occurrence of a periodic interval, the scheduled address request sent independently of said monitoring.

16. The method of claim 15, wherein the intelligent monitoring for the changes to the gateway address and port number combination further comprises:
executing a local process to identify any changes to the unique identifier; and sending an unscheduled address request to the address request server in response to identifying a unique identifier change, wherein the unscheduled address request is sent independently of the periodic interval.

17. The method of claim 16, wherein the local process is executed according to a schedule, and wherein the scheduled address requests are sent more frequently than execution of the local process.

18. The method of claim 13, wherein the predefined event is a gateway reset.

* * * * *